United States Patent
Liu et al.

(10) Patent No.: US 8,281,189 B2
(45) Date of Patent: Oct. 2, 2012

(54) SATA PRIMITIVE PREDICTION AND CORRECTION

(75) Inventors: Chuan Liu, Hsin-Chu (TW); Pao-Ching Tseng, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 515 days.

(21) Appl. No.: 12/611,926

(22) Filed: Nov. 3, 2009

(65) Prior Publication Data
US 2010/0050018 A1 Feb. 25, 2010

Related U.S. Application Data

(63) Continuation of application No. 11/456,077, filed on Jul. 6, 2006, now Pat. No. 7,634,692.

(60) Provisional application No. 60/766,771, filed on Feb. 10, 2006.

(51) Int. Cl.
*G06F 11/00* (2006.01)

(52) U.S. Cl. .......................................... 714/49; 714/746

(58) Field of Classification Search .................... 714/49, 714/746
See application file for complete search history.

(56) References Cited

U.S. PATENT DOCUMENTS

| | | | |
|---|---|---|---|
| 6,922,738 B2 | 7/2005 | Drescher | |
| 6,983,338 B2 | 1/2006 | Hadba | |
| 7,406,652 B2 | 7/2008 | Tseng | |
| 7,634,692 B2 * | 12/2009 | Liu et al. | 714/49 |
| 7,650,540 B2 * | 1/2010 | Chang et al. | 714/716 |
| 7,665,011 B2 | 2/2010 | Tseng | |
| 7,865,803 B2 * | 1/2011 | Liu et al. | 714/758 |
| 8,010,868 B2 * | 8/2011 | Tseng et al. | 714/758 |

FOREIGN PATENT DOCUMENTS

| | | |
|---|---|---|
| TW | I233067 | 5/2005 |
| TW | 200535796 | 11/2005 |

* cited by examiner

*Primary Examiner* — Stephen M Baker
(74) *Attorney, Agent, or Firm* — Winston Hsu; Scott Margo

(57) ABSTRACT

A method of correcting corrupted primitives transmitted between a serial advanced technology attachment (SATA) host and a SATA device includes analyzing a current state, a previously transmitted primitive, or a previously received primitive; selecting at least one candidate primitive according to at least one of the current state, the previously transmitted primitive and the previously received primitive; predicting the identity of a current primitive according to at least one candidate primitive and a received current primitive; and replacing the corrupted primitive with the predicted primitive when the predicted primitive is different from the current primitive.

19 Claims, 6 Drawing Sheets

| Transmitter | | Receiver | |
|---|---|---|---|
| XXXX | 102 | XXXX | 202 |
| XXXX | 104 | XXXX | 204 |
| X_RDY | 106 | XXXX | 206 |
| X_RDY | 108 | XXXX | 208 |
| CONT | 110 | XXXX | 210 |
| XXXX | 112 | XXXX | 212 |
| XXXX | 114 | R_RDY | 214 |
| XXXX | 116 | R_RDY | 216 |
| XXXX | 118 | CONT | 218 |
| SOF | 120 | XXXX | 220 |
| TYPE | 122 | XXXX | 222 |
| DATA | 124 | XXXX | 224 |
| DATA | 126 | R_IP | 226 |
| DATA | 128 | R_IP | 228 |
| DATA | 130 | CONT | 230 |
| HOLD | 132 | XXXX | 232 |
| HOLD | 134 | XXXX | 234 |
| CONT | 136 | XXXX | 236 |
| XXXX | 138 | XXXX | 238 |
| XXXX | 140 | HOLDA | 240 |
| XXXX | 142 | HOLDA | 242 |
| HOLD | 144 | CONT | 244 |
| DATA | 146 | XXXX | 246 |
| DATA | 148 | XXXX | 248 |
| DATA | 150 | XXXX | 250 |
| CRC | 152 | XXXX | 252 |
| EOF | 154 | R_IP | 254 |
| WTRM | 156 | R_IP | 256 |
| WTRM | 158 | CONT | 258 |
| WTRM | 160 | XXXX | 260 |
| CONT | 162 | XXXX | 262 |
| XXXX | 164 | R_OK | 264 |
| XXXX | 166 | R_OK | 266 |
| XXXX | 168 | CONT | 268 |
| XXXX | 170 | XXXX | 270 |
| SYNC | 172 | XXXX | 272 |
| SYNC | 174 | XXXX | 274 |
| CONT | 176 | XXXX | 276 |
| XXXX | 178 | XXXX | 278 |
| XXXX | 180 | SYNC | 280 |
| XXXX | 182 | SYNC | 282 |
| XXXX | 184 | CONT | 284 |
| XXXX | 186 | XXXX | 286 |
| XXXX | 188 | XXXX | 288 |

FIG. 2 RELATED ART

SATA PRIMITIVE PREDICTION AND CORRECTION

CROSS REFERENCE TO RELATED APPLICATIONS

This application is a continuation of U.S. patent application Ser. No. 11/456,077, filed Jul. 6, 2006, which claims the benefit of U.S. Provisional Patent Application No. 60/766,771, filed Feb. 10, 2006, the contents of both which are hereby incorporated by reference.

BACKGROUND

The invention relates to serial advanced technology attachment (SATA) devices, and more particularly, to a method of correcting primitives that have become corrupted due to noise.

In the SATA protocol, the host and the device exchange information through Frame Information Structures (FIS). Each FIS is composed of a group of Dwords, and the Dwords convey information between the host and the device. The SATA host and SATA device utilize primitives for control purposes and to provide a status of the serial line. Each primitive is also made up of one Dword. Primitives are also used to perform handshaking between a host and a device.

Please refer to FIG. 1. FIG. 1 is a table 10 illustrating byte contents of primitives used in the SATA protocol. Each primitive contains four bytes, and the contents of the first, second, third, and fourth bytes are shown in columns 12, 14, 16, and 18, respectively.

Please refer to FIG. 2. FIG. 2 is a diagram showing an example of sending a frame between a host and a device. The host can either be a transmitter 100 or a receiver 200, with the receiver being the other. In FIG. 2, the transmitter 100 transmits a series of data or primitives 102-188 to the receiver 200, and the receiver 200 responds with primitives 202-288 to be sent to the transmitter 100.

In FIG. 2, the transmitter 100 starts off by transmitting sync primitives followed by scrambled data packets 102, 104 to the receiver 200. The symbol "XXXX" represents the scrambled data values, and these data packets 102, 104 are not primitives. The scrambled data is used to reduce the effects of electromagnetic interference (EMI). When the transmitter 100 is ready to begin transmitting a frame to the receiver 200, the transmitter 100 outputs a transmission data ready (X_RDY) primitive indicating that the transmitter 100 is ready to transmit payload to the receiver 200. In this example, the transmitter 100 sends two X_RDY primitives 106, 108, issues a continue repeating previous primitive (CONT) primitive 110 to avoid having to output the same primitive repeatedly, and then outputs a series of scrambled data packets 112-118. The transmitter 100 continues this until the receiver 200 responds to the X_RDY primitives with a receiver ready (R_RDY) primitive, indicating that the receiver 200 is ready to receive the payload. In this example, the receiver 200 sends two R_RDY primitives 214, 216, issues a CONT primitive 218, and then outputs a series of scrambled data packets 220-224 until the transmitter 100 starts transmitting the frame.

The transmitter 100 sends a start of frame (SOF) primitive 120 to the receiver 200 to indicate that the frame is starting to be transmitted. Next, the transmitter 100 sends a type indicator 122 to specify the type of FIS that is being sent to the receiver 200, followed by a plurality of data packets 124-130. While the receiver 200 is receiving data from the transmitter 100, the receiver 200 outputs reception in progress (R_IP) primitives 226, 228 to the transmitter 100 followed by a CONT primitive 230 and scrambled data 232-238. When the transmitter 100 temporarily does not have any payload data ready for transmission, a hold data transmission (HOLD) primitive is output. As shown in FIG. 2, the transmitter 100 outputs HOLD primitives 132, 134 followed by a CONT primitive 136, scrambled data 138-142, and followed by another HOLD primitive 144. The receiver 200 acknowledges these HOLD primitives with hold acknowledge (HOLDA) primitives 240, 242 followed by a CONT primitive 244 and scrambled data 246-252.

The transmitter 100 then finishes sending the payload data with data packets 146-150, followed by cyclic redundancy check (CRC) data 152 and an end of frame (EOF) primitive 154. Next, the transmitter 100 continuously outputs wait for frame termination (WTRM) primitives 156-158, a CONT primitive 162, and scrambled data 164-170 while waiting for an indication of reception status from the receiver 200. The receiver 200, meanwhile, finishes receiving the payload data from the transmitter 100 and outputs R_IP primitives 254, 256 followed by a CONT primitive 258 and scrambled data 260, 262. After the receiver 200 has received all payload data, the CRC 152, the EOF 154, and verified that the CRC check has no problems, the receiver 200 then outputs reception with no error (R_OK) primitives 264, 266 followed by a CONT primitive 268 and scrambled data 270-278. If the CRC check did have problems, then the receiver 200 would instead output a reception error (R_ERR) primitive. Once the transmitter 100 has received the R_OK primitive from the receiver 200, the transmitter 100 then outputs synchronizing primitives (SYNC) 172, 174, followed by a CONT primitive 176 and scrambled data 178-188. The SYNC primitives are output when the transmitter 100 is idle, and also serve the purpose of synchronizing the transmitter 100 and the receiver 200. The receiver 200 will respond with SYNC primitives 280, 282, a CONT primitive 284, and scrambled data 286, 288 of its own.

The above scenario is illustrative of sending a frame of payload data without any transmission problems. However, noise can interfere with the transmission of primitives and data, which can cause communication problems between the transmitter 100 and the receiver 200. For instance, if the receiver 200 is not able to decode a SOF primitive sent from the transmitter 100, the receiver 200 will continue to send out a R_RDY primitive forever. However, the transmitter 100 will not know that the receiver 200 did not receive the SOF primitive, and will still send out data to the receiver 200 until the data transfer is complete, finishing by sending a WTRM primitive to the receiver 200. The receiver 200 will respond to the WTRM primitive with a SYNC primitive because it never received the SOF primitive at the beginning of the data transmission. Communication between the transmitter 100 and the receiver 200 may then hang at this point because the receiver 200 does not send either an R_OK or R_ERR primitive to the transmitter 100.

Another potential problem will result if HOLD, HOLDA, CONT, or EOF primitives are corrupted by noise. If these primitives are corrupted by noise, it may result in the wrong data transfer length. If the CRC check or 8-bit to 10-bit (8 b10 b) decoding are not able to identify this problem, then the problem may result in a system hang.

Additionally, if the HOLD, HOLDA, or CONT primitives are corrupted by noise, the transmitter 100 may send out too much data and overflow the first-in first-out receiving queue of the receiver 200. Because noise cannot always be eliminated entirely, there must be a way of overcoming the problems of corrupted primitives caused by noise.

SUMMARY

Methods for correcting corrupted primitives are provided. An exemplary embodiment of a method of correcting corrupted primitives transmitted between a serial advanced technology attachment (SATA) host and a SATA device includes analyzing a current state, a previously transmitted primitive, or a previously received primitive; selecting at least one candidate primitive according to at least one of the current state, the previously transmitted primitive and the previously received primitive; predicting the identity of a current primitive according to at least one candidate primitive and a received current primitive; and replacing the corrupted primitive with the predicted primitive when the predicted primitive is different from the current primitive.

Another exemplary embodiment of a method of correcting corrupted primitives transmitted between a SATA host and a SATA device includes comparing at least a portion of a received current primitive with at least a position of possible primitives; predicting the identity of a current primitive according to the comparison of the positions; and replacing the received current primitive with the predicted primitive.

Another exemplary embodiment of a method of detecting incorrect primitives transmitted between a SATA host and a SATA device includes receiving a first primitive; receiving a second primitive immediately following reception of the first primitive; and detecting that the second primitive is an incorrect primitive when the second primitive cannot follow the first primitive during normal operation of the SATA host and SATA device.

BRIEF DESCRIPTION OF THE DRAWINGS

FIG. 2 is a diagram showing an example of sending a frame between a host and a device.

DETAILED DESCRIPTION

Since primitives sent between the transmitter 100 and the receiver 200 can become corrupted by noise, it is useful to have a way of predicting what the original primitive was and then correcting the corrupted primitive to become the predicted primitive. Several exemplary embodiment methods are introduced for predicting the actual value of the corrupted primitive, and these embodiments can also be used in conjunction with each other for ensuring higher accuracy of the predictions. Each of the exemplary embodiment methods will be explained below with reference to FIG. 1 and FIG. 2.

First of all, some primitives are only used during certain transmission states. For example, after the receiver 200 has sent an R_RDY primitive to the transmitter 100, the receiver 200 will expect to receive an SOF primitive to begin frame transmission. Therefore, the receiver 200 can be restricted to predicting that a corrupted primitive is the SOF primitive only when sending out the R_RDY primitive. Moreover, the HOLD, HOLDA, CONT, and EOF primitives will only be corrected during a data transmission or data reception state. For example, the EOF primitive will only be expected when the receiver 200 is in a R_IP state, a direct memory access terminate (DMAT) state, or a HOLDA state, or a HOLD state. In these states, the EOF primitive can be predicted if it is determined to be the most likely value of the corrupted primitive. Similarly, the HOLD, HOLDA, and CONT primitives will only be expected when the receiver 200 is in a R_IP state, a direct memory access terminate (DMAT) state, a HOLDA state, a HOLD state, or when the transmitter 100 is in a HOLD state, HOLDA state or a data transmission state.

In addition to considering the current state of data transmission and reception, previously received primitives or later received primitives can also be used for predicting the value of corrupted primitives. Three, four, or five consecutive primitives can also be analyzed for determining the identity of corrupted primitives, wherein the corrupted primitive can be any one of the consecutive primitives being analyzed.

The CONT primitive especially benefits from these predictions due to the conditions under which it is used. As shown in FIG. 2, the CONT primitive always follows two identical primitives, and is often followed by scrambled data. The CONT primitive is used instead of having the same primitive repeatedly transmitted, which could cause problems with EMI. Because of the special pattern in which the CONT primitive always follows two identical primitives, it is easier to make predictions. That is, if a corrupted primitive follows two identical primitives, it is possible that the corrupted primitive is the CONT primitive. On the other hand, if a CONT primitive follows a pair of primitives, where one of the primitives is corrupted and the other is non-corrupted, the corrupted primitive can reliably be predicted to be identical to the non-corrupted primitive.

Figure 1:
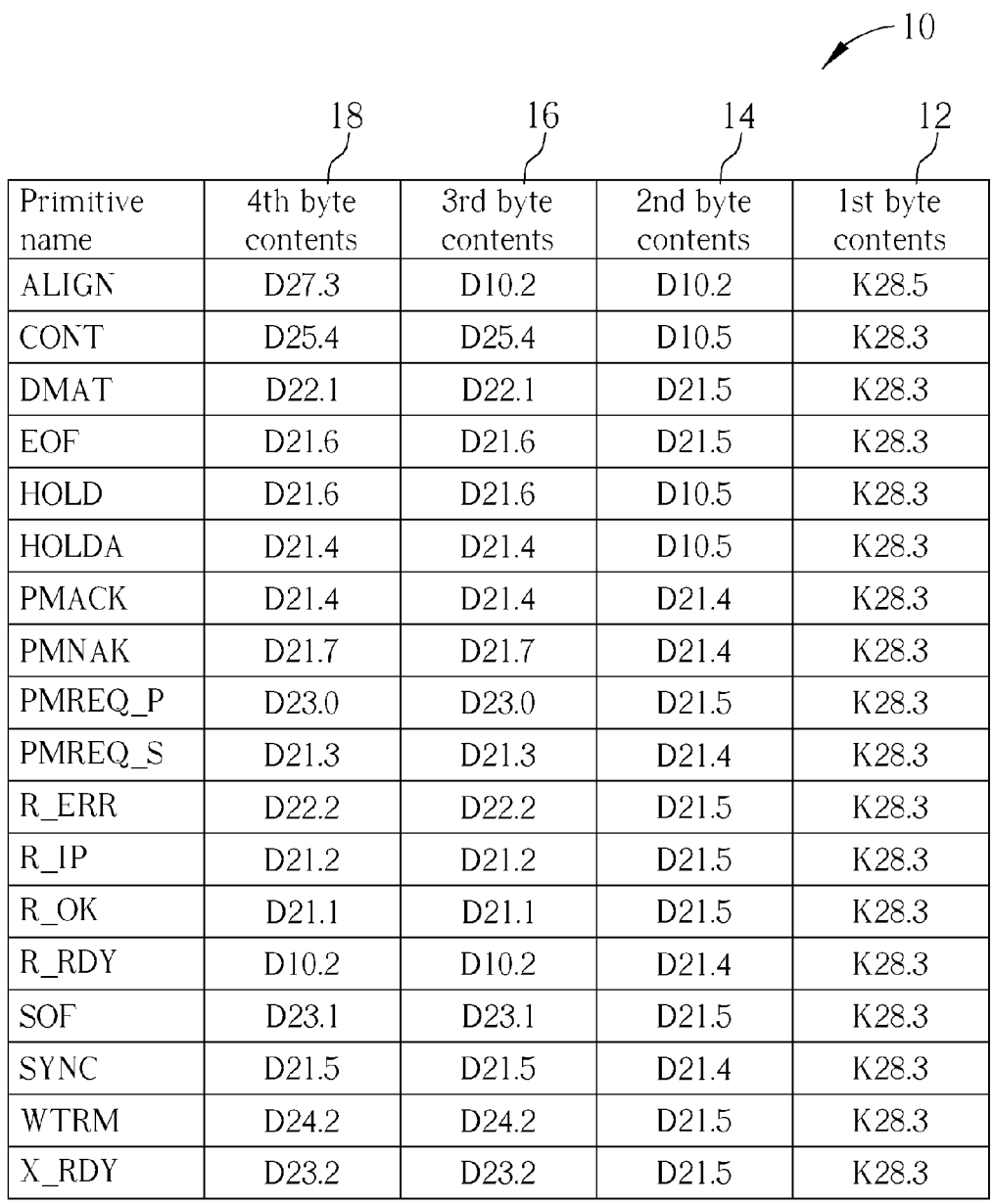
FIG. 1 is a table illustrating byte contents of primitives used in the SATA protocol.

As shown in FIG. 1, the contents of one or more bytes of corrupted primitives can also be used to predict the actual identity of the corrupted primitives. For example, when a third or a fourth byte of the corrupted primitive has a content of D23.1, the identity of the corrupted primitive is predicted to be a SOF primitive. Further checking can also be performed to ensure greater accuracy. That is, the content of other bytes such as the second, third, and fourth bytes of the corrupted primitive can also be checked to make sure that these bytes do not match the corresponding content of other possible primitives. In addition, fractions of the 32 or 40 bits of each corrupted primitive can also be compared to the known bit values of primitives to predict the identity of the corrupted primitive. A predetermined number of bits of the corrupted primitive can be compared with the predetermined number of bits of the possible primitives. For example, if the 23 least significant bits of the 40 bits of the corrupted primitive are consistent with the 23 least significant bits of the CONT primitive, then the corrupted primitive is predicted to be the CONT primitive.

The EOF primitive can also be similarly predicted. When a first byte of the corrupted primitive has a content of K28.3, a second byte of the corrupted primitive has a content of D21.5, and either a third byte or a fourth byte has a content of D21.6, the identity of the corrupted primitive is predicted to be an EOF primitive. Further checks can also be made to confirm that the content of both the third and fourth bytes of the corrupted primitive do not match the corresponding content of other possible primitives.

When a first byte of the corrupted primitive has a content of K28.3, a second byte of the corrupted primitive has a content of D10.5 and either a third byte or a fourth byte has a content of D25.4, the identity of the corrupted primitive can be predicted to be a CONT primitive. Further checks can be made to confirm that the content of the second, third, and fourth bytes of the corrupted primitive do not match the corresponding content of other possible primitives.

When a first byte of the corrupted primitive has a content of K28.3, a second byte has a content of D10.5, and either a third byte or a fourth byte has a content of D21.6, the identity of the corrupted primitive is predicted to be a HOLD primitive. Further checks can also be made to confirm that the content of the third and fourth bytes of the corrupted primitive do not match the corresponding content of other possible primitives.

When a first byte of the corrupted primitive has a content of K28.3, a second byte has a content of D10.5, and either a third byte or a fourth byte has a content of D21.4, the identity of the corrupted primitive is predicted to be a HOLDA primitive. Further checks can also be made to confirm that the content of the third and fourth bytes of the corrupted primitive do not match the corresponding content of other possible primitives.

Figure 3:
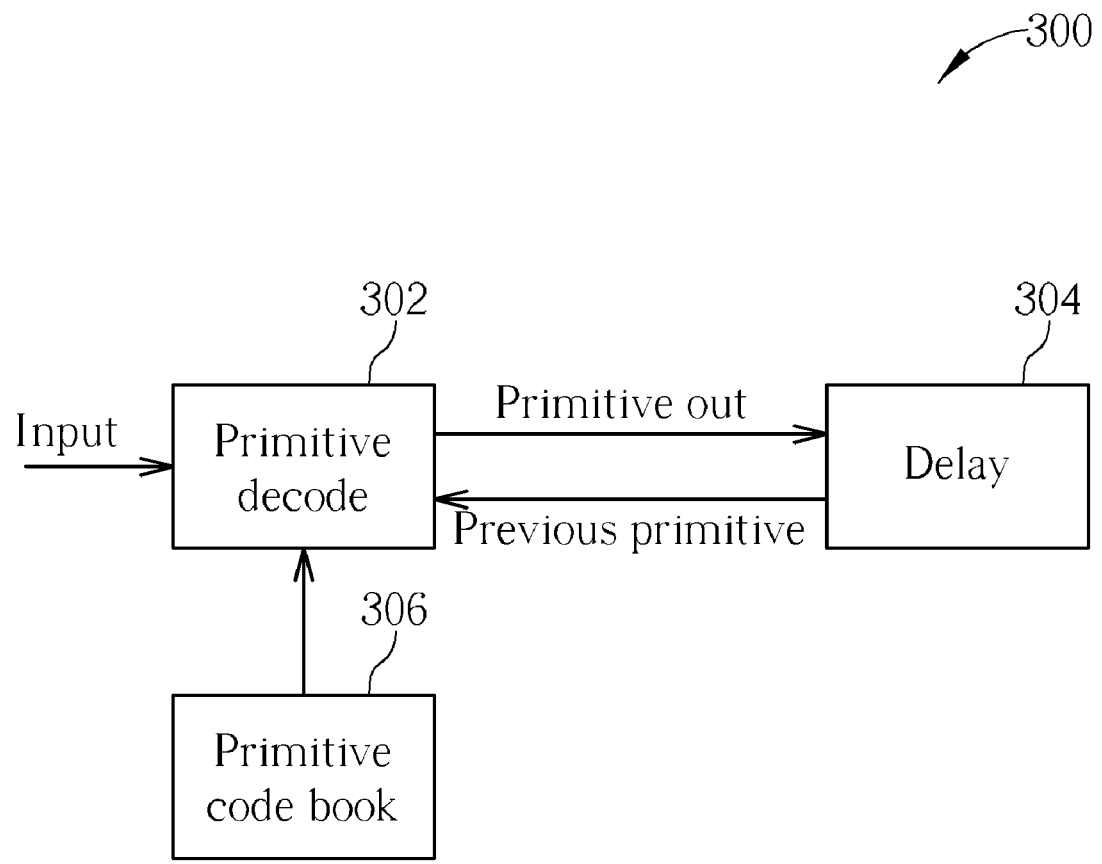
FIG. 3 is a functional block diagram of an exemplary embodiment primitive prediction system.

Please refer to FIG. 3. FIG. 3 is a functional block diagram of an exemplary embodiment primitive prediction system 300. The system 300 includes a primitive decode circuit 302 which receives a series of primitives as input. As each primitive is received by the primitive decode circuit 302, it predicts the value of the primitive if the primitive is corrupted and passes the primitive on to a delay circuit 304. The delay circuit 304 adds a delay of one primitive period, and outputs the previously received primitive to the primitive decode circuit 302 as the primitive decode circuit 302 is receiving the following primitive. Furthermore, the primitive decode circuit 302 reads information from a primitive code book 306 for determining the actual bit and byte values that the primitives should have. The primitive decode circuit 302 uses information including one or more previously received primitives, the currently received primitive, and the values of standard primitives according to the primitive code book 306 to predict the value of the corrupted primitive.

Figure 4:
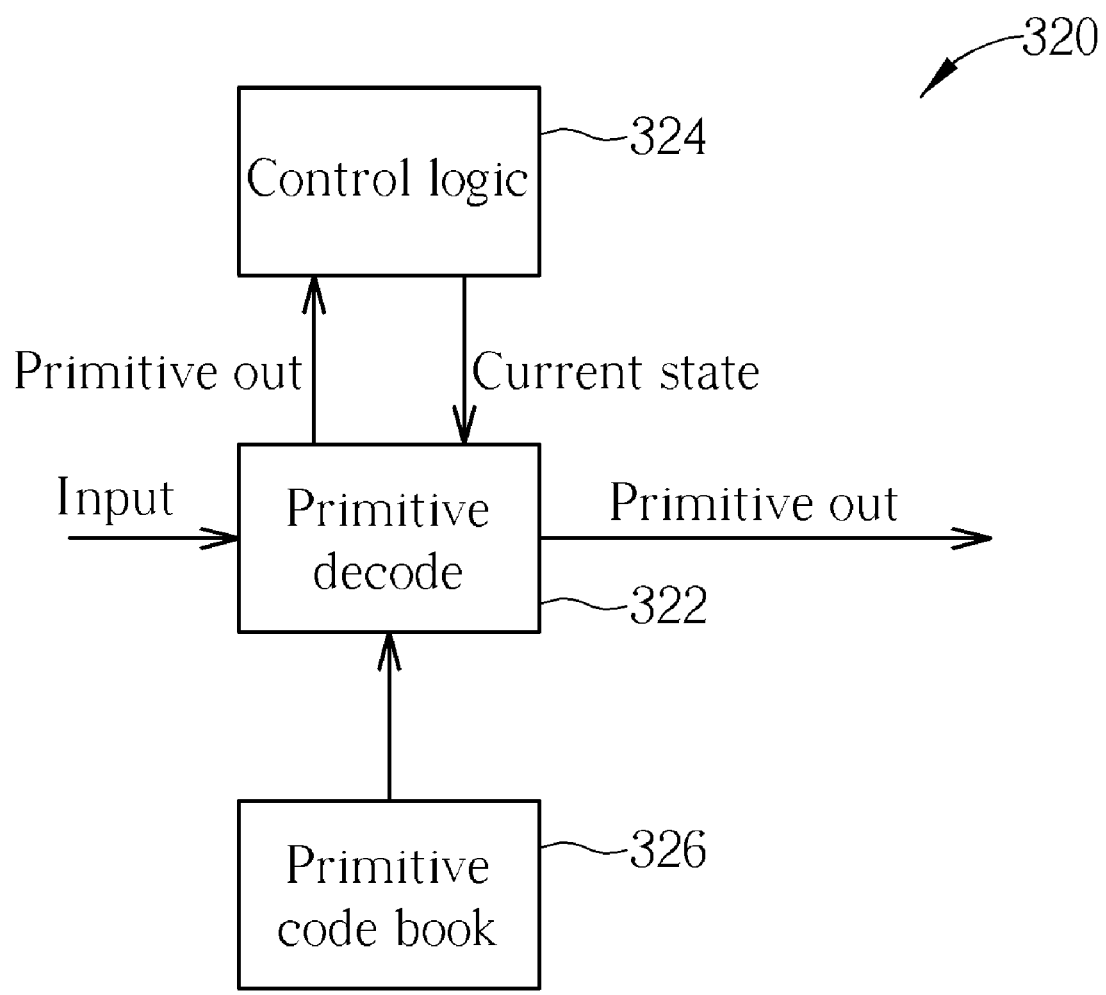
FIG. 4 is a functional block diagram of another exemplary embodiment primitive prediction system.

Please refer to FIG. 4. FIG. 4 is a functional block diagram of another exemplary embodiment primitive prediction system 320. The system 320 includes a primitive decode circuit 322, a primitive code book 326, and control logic 324. The primitive decode circuit 322 receives a series of primitives as input, predicts the values of the primitives and outputs the predicted primitives. A copy of the predicted primitives is also passed to the control logic 324, which keeps track of the current state of transmission and reception. The control logic 324 will output the current state to the primitive decode circuit 322, which uses this information together with information from the primitive code book 326 to predict the values of corrupted primitives.

Figure 5:
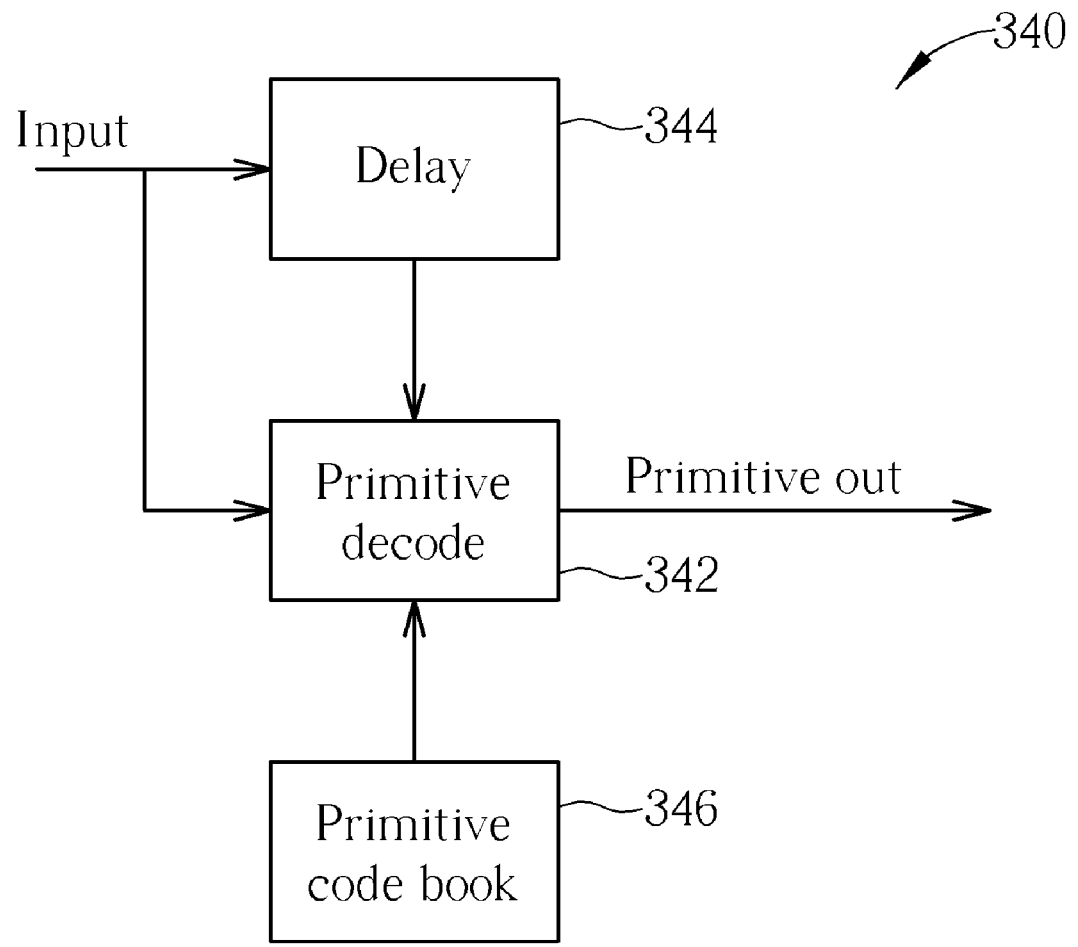
FIG. 5 is a functional block diagram of another exemplary embodiment primitive prediction system.

Please refer to FIG. 5. FIG. 5 is a functional block diagram of another exemplary embodiment primitive prediction system 340. The system 340 is similar to the system 300 shown in FIG. 4, but has a slightly different arrangement of a delay circuit 344. Received primitives are input to both the delay circuit 344 and a primitive decode circuit 342. The primitive decode circuit 342 also receives previously received primitives from the delay circuit 344. The primitive decode circuit 342 uses the previously received primitive information together with the current primitive value and information from a primitive code book 346 to predict the values of corrupted primitives.

Figure 6:
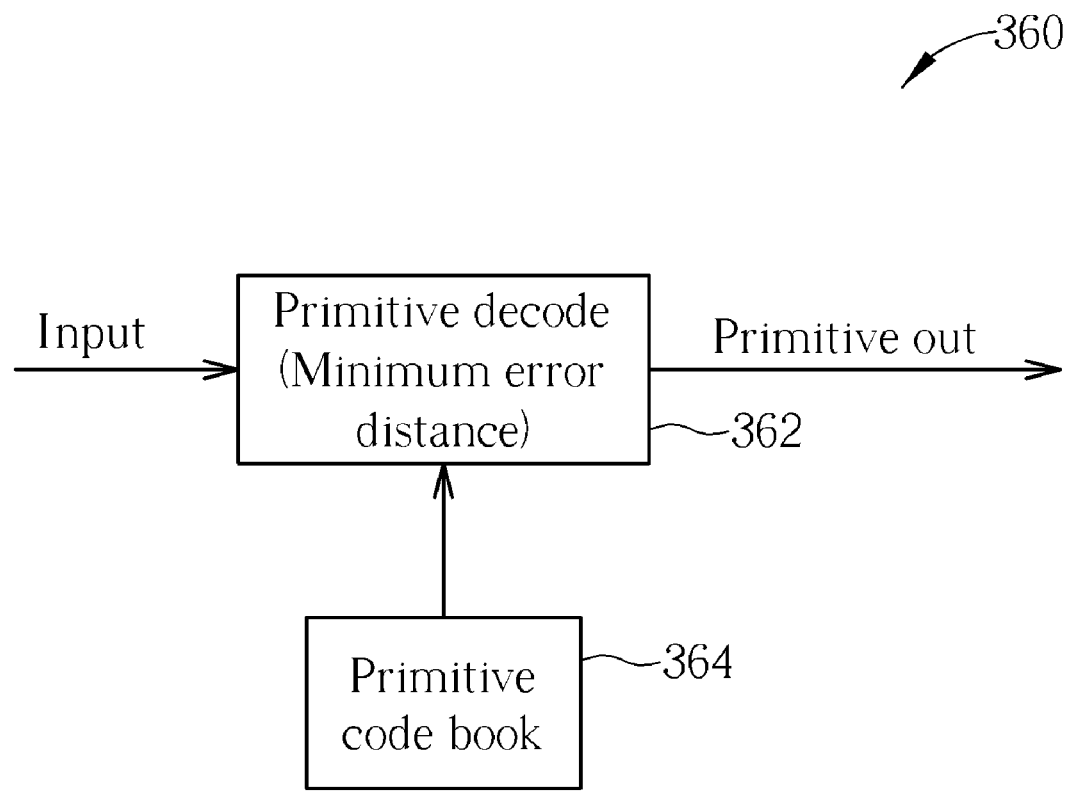
FIG. 6 is a functional block diagram of yet another exemplary embodiment primitive prediction system.

Please refer to FIG. 6. FIG. 6 is a functional block diagram of yet another exemplary embodiment primitive prediction system 360. The system 360 comprises a primitive decode circuit 362 and a primitive code book 364. The primitive decode circuit 362 receives a current primitive and compares the bits and bytes of the current primitives to standard primitive values contained in the primitive code book 364. The current primitive is then predicted to be whichever standard primitive the current primitive is closest to out of all of the candidate primitives. In order for the corrupted primitive to be closest in contents to a specific candidate primitive as compared to the other candidate primitives, the hamming distance between the corrupted primitive and the specific candidate primitive is smallest as compared to the other candidate primitives. The hamming distance is measured by performing an exclusive-OR (XOR) function on the candidate primitives and the corrupted primitives bit by bit.

It should be noted that the prediction of the identity of corrupted primitives is not limited to the SOF, HOLD, HOLDA, CONT, and EOF primitives. Other primitives can also be predicted and corrected in the same way that these five primitives are. However, the incorrect detection of these five primitives can have the effect of stalling or hanging communication and data transmission between the transmitter 100 and the receiver 200, so they are viewed as especially important. For best results, both state information and byte content comparisons are used to predict the identity of corrupted primitives. Once the identity of the corrupted primitive is determined, the corrupted primitive is then replaced with the predicted primitive for elimination communication problems between the transmitter 100 and the receiver 200. The above method is suitable for application to the serial advanced technology attachment (SATA) specification or Serial-Attached SCSI (SAS) specification, along with any other similar communication standards.

In addition to predicting the identity of corrupted primitives, incorrect primitives can also be detected by analyzing both the previously received primitive and the currently received primitive that immediately follows the previously received primitive. For example, if the previously received primitive is a reception with no error (R_OK) primitive and the currently received primitive is a reception error (R_ERR) primitive, it can be deduced that the currently received primitive is an incorrect primitive since the reception error (R_ERR) primitive cannot follow the reception with no error (R_OK) primitive. Likewise, if the previously received primitive is a transmission data ready (X_RDY) primitive and the currently received primitive is a wait for frame termination (WTRM) primitive, it can be deduced that the currently received primitive is an incorrect primitive since the wait for frame termination (WTRM) primitive cannot follow the transmission data ready (X_RDY) primitive Therefore, even if the currently received primitive is a valid primitive and adheres to the protocol of the serial advanced technology attachment (SATA) specification, incorrect primitives can still be detected.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting primitives transmitted between a serial advanced technology attachment (SATA) host and a SATA device, the method comprising:
   analyzing a current state, a previously transmitted primitive, or a previously received primitive;
   selecting at least one candidate primitive according to at least one of the current state, the previously transmitted primitive and the previously received primitive;

predicting the identity of a current primitive according to at least one candidate primitive and a received current primitive; and replacing the received current primitive with the predicted primitive when the predicted primitive is different from the current primitive.

2. The method of claim 1, wherein when at least one byte of the received current primitive has the same content as a corresponding byte of a specific candidate primitive X, the identity of the current primitive is predicted to be primitive X.

3. The method of claim 1, wherein when M bytes of N bytes of the received current primitive have the same content as corresponding bytes of a specific candidate primitive X, the identity of the current primitive is predicted to be primitive X.

4. The method of claim 1, wherein when fractions of the received current primitive have the same content as a specific candidate primitive X, the identity of the current primitive is predicted to be primitive X.

5. The method of claim 1, wherein when the received current primitive is closest in contents to a specific candidate primitive X as compared to the other candidate primitives, the identity of the current primitive is predicted to be primitive X.

6. The method of claim 1, wherein the candidate primitives are selected from the group consisting of SOF, EOF, CONT, HOLD, and HOLDA.

7. The method of claim 1, wherein when the current state is a receiver ready state, a third byte of the received current primitive has a content of D23.1 or a fourth byte of the received current primitive has a content of D23.1, and the previously transmitted primitive as a $R_{13}$ RDY primitive, the identity of the current primitive is predicted to be a start of frame (SOF) primitive.

8. The method of claim 1, wherein when analyzing that the previously received primitive was a transmission data ready (X_RDY) primitive and a third byte of the received current primitive has a content of D23.1 or a fourth byte of the received current primitive has a content of D23.1, the identity of the current primitive is predicted to be a start of frame (SOF) primitive.

9. The method of claim 1, wherein when the current state of data transmission or data reception indicates that a received current primitive is received in one of the two primitives preceding a continue repeating previous primitive (CONT) primitive, the current primitive is predicted to be equal to the other of the two primitives that is not current.

10. A method of correcting primitives transmitted between a serial advanced technology attachment (SATA) host and a SATA device, the method comprising:
comparing at least a portion of a received current primitive with at least a position of possible primitives;
predicting the identity of a current primitive according to the comparison of the positions; and
replacing the received current primitive with the predicted primitive.

11. The method of claim 10, wherein when a first byte of the received current primitive has a content of K28.3, a third byte of the received current primitive has a content of D23.1 or a fourth byte of the received current primitive has a content of D23.1, and content of the second, third, and fourth bytes of the received current primitive does not match the corresponding content of other possible primitives, the identity of the current primitive is predicted to be a start of frame (SOF) primitive.

12. The method of claim 10, wherein when a first byte of the received current primitive has a content of K28.3, a second byte of the received current primitive has a content of D21.5, and either a third byte or a fourth byte has a content of D21.6, and content of third and fourth bytes of the received current primitive does not match the corresponding content of other possible primitives, the identity of the current primitive is predicted to be an end of frame (EOF) primitive.

13. The method of claim 10, wherein when a first byte of the received current primitive has a content of K28.3 and either a third byte or a fourth byte has a content of D25.4, and content of the second, third, and fourth bytes of the received current primitive does not match the corresponding content of other possible primitives, the identity of the current primitive is predicted to be a continue repeating previous primitive (CONT) primitive.

14. The method of claim 10, wherein when a first byte of the received current primitive has a content of K28.3 and a second byte of the received current primitive has a content of D10.5, either a third byte or a fourth byte has a content of D25.4, the identity of the current primitive is predicted to be a continue repeating previous primitive (CONT) primitive, wherein the content of the third, and fourth bytes of the received current primitive do not match the corresponding content of other possible primitives.

15. The method of claim 10, wherein when a first byte of the received current primitive has a content of K28.3, second byte has a content of D10.5, and either a third byte or a fourth byte has a content of D21.6, and content of the third and fourth bytes of the received current primitive does not match the corresponding content of other possible primitives, the identity of the current primitive is predicted to be a hold data transmission (HOLD) primitive.

16. The method of claim 10, wherein when a first byte of the received current primitive has a content of K28.3, second byte has a content of D10.5 and either a third byte or a fourth byte has a content of D21.4, and content of the third and fourth bytes of the received current primitive does not match the corresponding content of other possible primitives, the identity of the received current primitive is predicted to be a hold acknowledge (HOLDA) primitive.

17. A method of detecting incorrect primitives transmitted between a serial advanced technology attachment (SATA) host and a SATA device, the method comprising:
receiving a first primitive;
receiving a second primitive immediately following reception of the first primitive; and
detecting that the second primitive is an incorrect primitive when the second primitive cannot follow the first primitive during normal operation of the SATA host and SATA device.

18. The method of claim 17, wherein the first primitive is a reception with no error (R_OK) primitive and the second primitive is a reception error (R_ERR) primitive.

19. The method of claim 17, wherein the first primitive is a transmission data ready (X_RDY) primitive and the second primitive is a wait for frame termination (WTRM) primitive.

* * * * *